(12) United States Patent
Saito (10) Patent No.: US 8,880,264 B2
(45) Date of Patent: Nov. 4, 2014

(54) CHARGING CONTROL APPARATUS FOR ELECTRIC VEHICLE

(75) Inventor: Jun Saito, Tokyo (JP)

(73) Assignee: Mitsubishi Jidosha Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/885,308

(22) PCT Filed: Nov. 2, 2011

(86) PCT No.: PCT/JP2011/075278
§ 371 (c)(1),
(2), (4) Date: May 14, 2013

(87) PCT Pub. No.: WO2012/066934
PCT Pub. Date: May 24, 2012

(65) Prior Publication Data
US 2013/0231818 A1    Sep. 5, 2013

(30) Foreign Application Priority Data

Nov. 15, 2010   (JP) .................................. 2010-255351

(51) Int. Cl.
*B60L 11/18*     (2006.01)
*H01M 10/44*     (2006.01)
*H01M 10/48*     (2006.01)

(52) U.S. Cl.
CPC ............. *B60L 11/1838* (2013.01); *Y02E 60/12* (2013.01); *Y02T 90/14* (2013.01); *B60L 11/184* (2013.01); *Y02T 90/169* (2013.01); *Y02T 10/7005* (2013.01); *H01M 10/44* (2013.01); *Y04S 30/14* (2013.01); *Y02T 90/128* (2013.01); *B60L 11/185* (2013.01); *H01M 10/48* (2013.01); *Y02T 10/7088* (2013.01)
USPC .......................................................... 701/22

(58) Field of Classification Search
CPC ...................................................... B60L 11/184
USPC ............................................................. 701/22
See application file for complete search history.

(56) References Cited

U.S. PATENT DOCUMENTS 5,545,969 A * 8/1996 Hasegawa ..................... 320/134
5,612,608 A * 3/1997 Ishiguro et al. ........... 340/636.12
(Continued)

FOREIGN PATENT DOCUMENTS

JP     7-73903 A     3/1995
JP    07073903 A *  3/1995  ............ H01M 10/44
(Continued)

OTHER PUBLICATIONS

JPO machine translation of JP 07-73903 (original JP document published Mar. 17, 1995).*

(Continued)

*Primary Examiner* — Behrang Badii
*Assistant Examiner* — David Testardi
(74) *Attorney, Agent, or Firm* — Birch, Stewart, Kolasch & Birch, LLP (57) ABSTRACT

A charging control apparatus for an electric vehicle comprises: a charging efficiency computation device 21 for computing the charging efficiency of a driving battery 2; a state of change computation device 22 for computing the state of change of the driving battery 2; and a switching device 25 for switching, in response to a request from a user of the vehicle, between a first charging mode in which the charger 7 is controlled based on the charging efficiency to charge the driving battery 2, and a second charging mode in which the charger 7 is controlled based on the state of change to charge the driving battery 2.

17 Claims, 6 Drawing Sheets

(56) References Cited

U.S. PATENT DOCUMENTS

| | | | |
|---|---|---|---|
| 5,623,194 A * | 4/1997 | Boll et al. | 320/137 |
| 5,939,855 A * | 8/1999 | Proctor et al. | 320/104 |
| 5,982,152 A * | 11/1999 | Watanabe et al. | 320/150 |
| 6,188,202 B1 * | 2/2001 | Yagi et al. | 320/150 |
| 6,215,281 B1 * | 4/2001 | Koch | 320/150 |
| 6,320,354 B1 * | 11/2001 | Sengupta et al. | 320/132 |
| 6,353,304 B1 * | 3/2002 | Atcitty et al. | 320/116 |
| 6,696,818 B2 * | 2/2004 | Arai et al. | 320/132 |
| 7,719,232 B2 * | 5/2010 | Kelty et al. | 320/132 |
| 2006/0273761 A1 * | 12/2006 | Arai et al. | 320/132 |
| 2008/0284379 A1 * | 11/2008 | Hirano | 320/150 |
| 2009/0326749 A1 * | 12/2009 | Uchida | 701/22 |
| 2010/0161217 A1 * | 6/2010 | Yamamoto | 701/207 |
| 2012/0181992 A1 * | 7/2012 | Brun-Buisson et al. | 320/153 |

FOREIGN PATENT DOCUMENTS

| | | | | |
|---|---|---|---|---|
| JP | 08106921 A * | 4/1996 | | H01M 10/44 |
| JP | 08107634 A * | 4/1996 | | H02J 7/10 |
| JP | 9-19074 A | 1/1997 | | |
| JP | 09261886 A * | 10/1997 | | H02J 7/10 |
| JP | 11-98697 A | 4/1999 | | |
| JP | 11-341695 A | 12/1999 | | |
| JP | 2000-23383 A | 1/2000 | | |
| JP | 2001-309569 A | 11/2001 | | |
| JP | 2008-83022 A | 4/2008 | | |
| JP | 2008-295170 A | 12/2008 | | |
| JP | 2009-148151 A | 7/2009 | | |
| JP | 2009-189088 A | 8/2009 | | |
| JP | 2009-284685 A | 12/2009 | | |
| JP | 2010-11523 A | 1/2010 | | |
| JP | 2010-124537 A | 6/2010 | | |
| JP | 2010124652 A * | 6/2010 | | |
| JP | 2010-193670 A | 9/2010 | | |
| JP | 2010-200530 A | 9/2010 | | |
| JP | 2010-206871 A | 9/2010 | | |
| WO | WO 2009051014 A1 * | 4/2009 | | H01M 10/44 |

OTHER PUBLICATIONS

Office Action of related Japanese Patent Application No. 2010-255352 issued Sep. 25, 2013, (in Japanese).

* cited by examiner

CHARGING CONTROL APPARATUS FOR ELECTRIC VEHICLE

TECHNICAL FIELD

This invention relates to a charging control apparatus for an electric vehicle, which controls the charging of a driving battery (secondary battery) aboard the electric vehicle.

BACKGROUND ART

In recent years, a number of electric vehicles such as battery electric vehicles (BEV; may be called electric cars) or plug-in hybrid vehicles (PHV) have been put to practical use. Driving batteries installed on such electric vehicles are electrically charged, for example, by power supplied from a commercial power supply, such as a domestic power supply, via a charging cable connected to a charging inlet of a vehicle body.

Methods for controlling charging include, for example, constant current charging by which the driving battery is charged at a constant current, constant voltage charging by which it is charged at a constant voltage, and constant power charging by which it is charged at a constant power. Various charging control methods comprising combinations of these methods are proposed. Concretely, the method in common use comprises performing constant power charging in which the electric energy is rendered constant in the initial stage of charging; terminating the constant power charging when the state if charge (SOC) of the driving battery rises to bring the voltage to a predetermined value; and, at this time, performing constant voltage charging for charging at a constant voltage (see, for example, Patent Document 1).

PRIOR ART DOCUMENTS

Patent Documents

Patent Document 1: JP-A-2009-284685 (FIG. 5, etc.)

SUMMARY OF THE INVENTION

Problems to be Solved by the Invention

By performing charging with the use of the control method as described above, it becomes possible to shorten the charging time (the time until the driving battery is fully charged) while preventing the overcharge of the driving battery.

With the constant voltage charging, however, an input is kept down in order to maintain the voltage of the driving battery at a constant level. Thus, charging of the same electric energy requires a longer time than during constant power charging. Moreover, part of the power for charging is always consumed by various accessories loaded in the electric vehicle. Hence, the proportion of power consumption is higher during the constant voltage charging than during the constant power charging. As a result, the charging efficiency during the constant voltage charging is lower than the constant power charging.

Regardless of the above-mentioned charging control method, restriction of the input is necessary to prevent overcharge of the driving battery. That is, for full charging of the driving battery, a period with a relatively low charging efficiency occurs during the charging period, no matter which of the charging control methods is adopted.

Usually, charging of the driving battery loaded in the electric vehicle is carried out until the driving battery reaches a full charge. By so doing, the cruising distance of the electric vehicle can be lengthened maximally. However, a long cruising distance is not necessarily needed, depending on a user.

The present invention has been accomplished in the light of the above circumstances, and aims to provide a charging control apparatus for an electric vehicle, which can achieve a high economic efficiency in the charging of a driving battery in response to a request from the user.

Means for Solving the Problems

A first aspect of the present invention, which solves the above-mentioned problems, is a charging control apparatus for an electric vehicle, in which a driving battery loaded on the vehicle is charged by power supplied from an external power supply via a charger, comprising: a charging efficiency computation device that computes the charging efficiency of the driving battery; a state of charge computation device that computes a state of charge of the driving battery; and a switching device that switches, in response to a request from a user of the vehicle, between a first charging mode in which the charger is controlled based on the charging efficiency to charge the driving battery, and a second charging mode in which the charger is controlled based on the state of charge to charge the driving battery.

According to the first aspect, charging of the driving battery with a high economic efficiency can be achieved. In response to the user's request, moreover, it is possible to perform charging until the driving battery becomes fully charged, or charging only during a period with a high charging efficiency, with emphasis on economy.

A second aspect of the present invention is the charging control apparatus for an electric vehicle according to the first aspect, further comprising a first determination device that determines whether or not the charging efficiency of the driving battery computed by the charging efficiency computation device is lower than a predetermined value, wherein if the first charging mode is selected by the switching device, and if it is determined by the first determination device that the charging efficiency is lower than the predetermined value, then the charger is controlled to stop charging of the driving battery.

According to the second aspect, the charging efficiency is determined accurately. Thus, charging is performed reliably only during the period with a high charging efficiency.

A third aspect of the present invention is the charging control apparatus for an electric vehicle according to the first or second aspect, further comprising a charger-supplied power computation device that computes power supplied from the external power supply to the charger, and a battery-supplied power computation device that computes power supplied from the charger to the driving battery, wherein the charging efficiency computation device computes the charging efficiency based on results of computations by the charger-supplied power computation device and the battery-supplied power computation device.

According to the third aspect, the charging efficiency is determined more accurately. Thus, charging is performed more reliably only during the period with a high charging efficiency.

A fourth aspect of the present invention is the charging control apparatus for an electric vehicle according to the third aspect, wherein the charging efficiency computation device sets a value, which has been obtained by dividing the power supplied from the charger to the driving battery by the power supplied from the external power supply to the charger, as the charging efficiency.

According to the fourth aspect, the charging efficiency can be calculated reliably.

A fifth aspect of the present invention is the charging control apparatus for an electric vehicle according to any one of the first to fourth aspects, further comprising a second determination device that determines whether or not the state of charge of the driving battery computed by the state of charge computation device has reached a predetermined value, wherein if the second charging mode is selected by the switching device, and if it is determined by the second determination device that the state of charge has reached the predetermined value, then the charger is controlled to stop charging of the driving battery.

According to the fifth aspect, the driving battery can be brought to a predetermined state of charge (full charge) in response to a request from the user.

A sixth aspect of the present invention is the charging control apparatus for an electric vehicle according to any one of the first to fifth aspects, further comprising a charging state display device that allows a display unit provided in the vehicle to display the charging state of the driving battery, wherein the charging state display device allows the display unit to display at least the charging efficiency as the charging state.

According to the sixth aspect, the user of the electric vehicle can easily recognize the charging state, including the charging efficiency, by visual sensation, and based on this recognition, can stop charging with a desired timing.

A seventh aspect of the present invention is the charging control apparatus for an electric vehicle according to the sixth aspect, wherein the charging state display device allows the display unit to display the state of charge as well as the charging efficiency as the charging state.

According to the seventh aspect, the state of charge of the driving battery can be easily recognized by visual sensation. Thus, charging can be stopped with a more preferred timing.

An eighth aspect of the present invention is the charging control apparatus for an electric vehicle according to the sixth or seventh aspect, wherein the charging state display device allows the display unit to display the degree of the charging efficiency as the height of a segment.

According to the eighth aspect, the user of the electric vehicle can easily recognize the charging efficiency by visual sensation.

A ninth aspect of the present invention is the charging control apparatus for an electric vehicle according to the sixth or seventh aspect, wherein the charging state display device allows the display unit to display a change in the charging efficiency as a change in the color of the segment.

According to the ninth aspect, the user of the electric vehicle can easily recognize the charging efficiency by visual sensation.

Effects of the Invention

The above-described charging control apparatus for an electric vehicle according to the present invention can achieve the high economic efficiency charging of the driving battery. With this charging control apparatus, moreover, not only full charging of the driving battery, but also charging only during a period with a high charging efficiency, with emphasis on economy, can be performed in response to a request from the user. That is, optimal charging of the driving battery adapted for various circumstances can be performed.

Furthermore, according to the charging control apparatus for an electric vehicle concerned with the present invention, the user of the electric vehicle can stop charging with a desired timing, depending on the charging state including the charging efficiency. Thus, charging with a high economic efficiency can be realized for the driving battery. Moreover, optimal charging of the driving battery can be achieved in conformity with various circumstances.

BRIEF DESCRIPTION OF THE DRAWINGS

FIG. 3 is a graph showing changes in various parameters during charging.

MODE FOR CARRYING OUT THE INVENTION

An embodiment of the present invention will now be described in detail with reference to the accompanying drawings.

Figure 1:
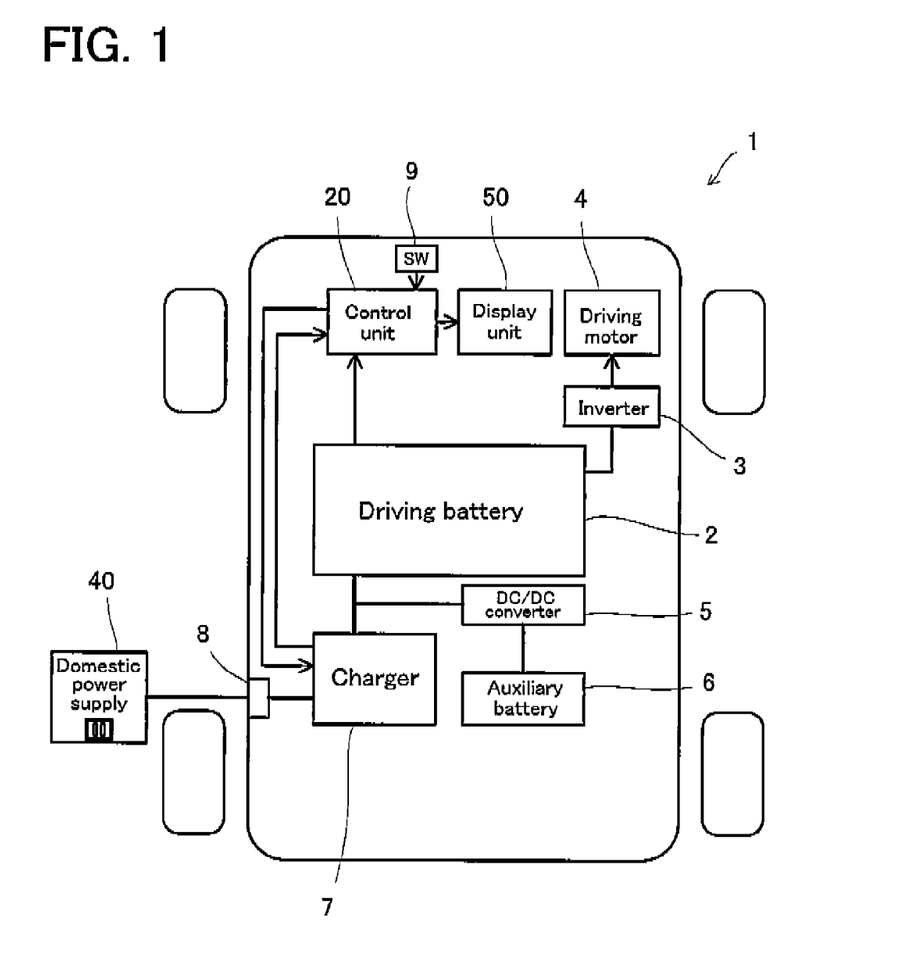
FIG. 1 is a schematic configurational drawing showing an electric car according to an embodiment of the present invention.

As shown in FIG. 1, an electric car 1, which is an example of an electric vehicle, is loaded with a driving battery 2 as a secondary battery. This driving battery 2 is electrically connected to a driving motor 4 via an inverter 3. The driving motor 4 is coupled to driving wheels, although this is not illustrated. The electric car 1 is allowed to run by the driving force of the driving motor 4. An auxiliary battery (12 V battery) 6 is also connected to the driving battery 2 via a DC/DC converter 5. Various accessories (not shown) are connected to the auxiliary battery 6, and the respective accessories are driven by power supplied from the auxiliary battery 6.

The electric car 1 is also loaded with a charger 7 for charging the driving battery 2, and is further loaded with a control unit (ECU) 20 as a charging control apparatus for controlling the charger 7. The charger 7 is interposed between the driving battery 2 installed on the electric car 1, and a domestic power supply (external power supply) 40 which is a commercial power supply. In charging the driving battery 2, the domestic power supply 40 and the charger 7 are connected together via a charging cable connected to a charging inlet 8 of the electric car 1, whereby alternating current power of the order of 100 V is inputted from the domestic power supply 40 to the charger 7. In the charger 7, the input power from the domestic power supply 40 is converted and boosted to direct current power of the order of 350 V, which is used as charging power suitable for charging of the driving battery 2. This charging power is inputted to the driving battery 2 to charge the driving battery 2.

The electric car 1 is also equipped with a display unit 50 for displaying the charging state of the driving battery 2 when charged. The display unit 50 is composed of, for example, a meter and a monitor to display, as appropriate, the charging state, which changes during charging, on the basis of signals from a charging state display device to be described later.

The term "charging state" mentioned above includes, at least, a charging efficiency which changes at the time of charging. In the present embodiment, the "charging state" includes the charging efficiency and the state of charge of the driving battery 2 when charged. That is, the display unit 50 is adapted to display, as appropriate, the state of charge as well as the charging efficiency of the driving battery 2 during charging.

Figure 2:
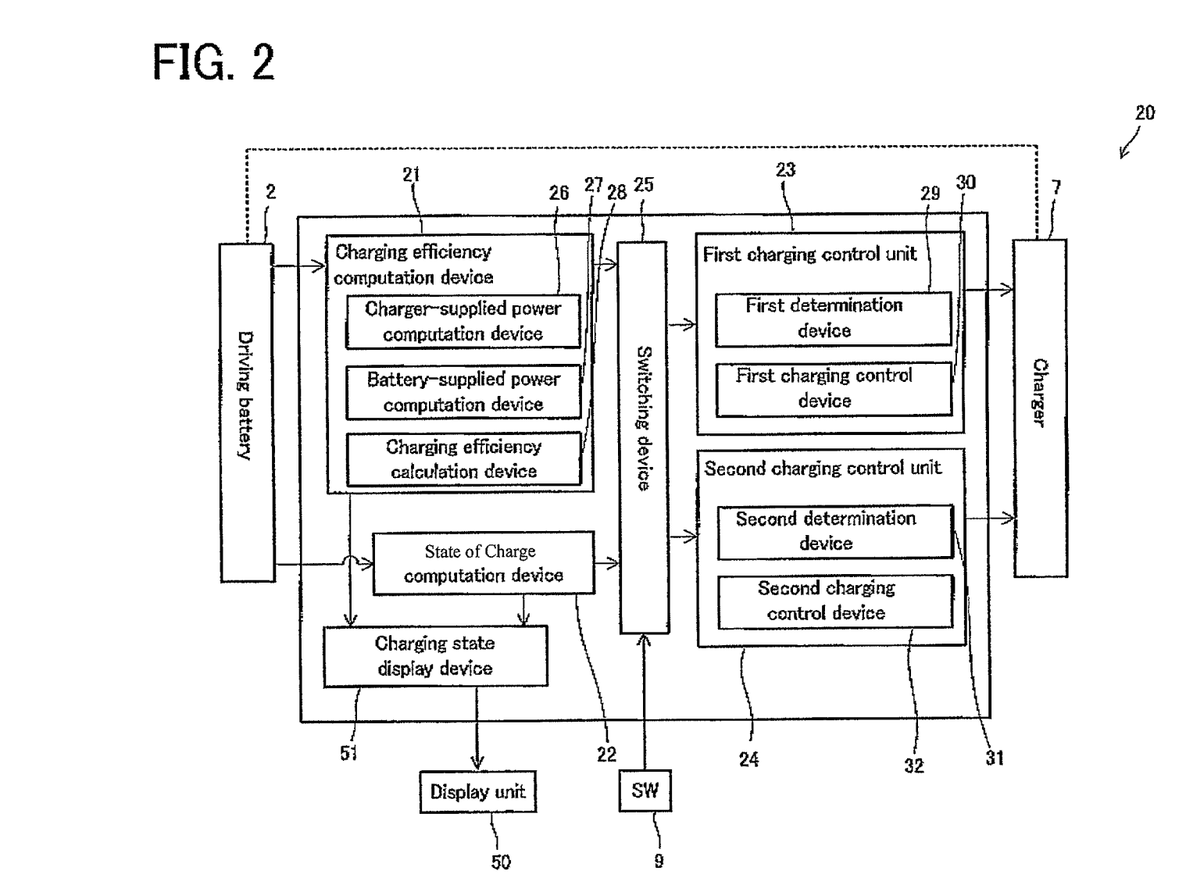
FIG. 2 is a block diagram showing the schematic configuration of a control unit of a charging control apparatus according to the embodiment.

The control unit 20 is equipped with a charging efficiency computation device 21, a state of charge computation device 22, a first charging control unit 23, a second charging control unit 24, and a switching device 25, as shown in a block diagram of FIG. 2. The control unit 20 is further provided with a charging state display device 51.

The charging efficiency computation device 21 computes the charging efficiency Ec of the driving battery 2. In the present embodiment, the charging efficiency computation device 21 is composed of a charger-supplied power computation device 26, a battery-supplied power computation device 27, and a charging efficiency calculation device 28. The charger-supplied power computation device 26 computes a charger input power Pc inputted from the domestic power supply 40 to the charger 7. The charger input power Pc is computed from an input current Ic and an input voltage Vc entered from the domestic power supply 40 into the charger 7, and is represented by the following equation (1).

$$Pc = Ic \times Vc \quad (1)$$

The battery-supplied power computation device 27 computes power supplied from the charger 7 to the driving battery 2, namely, a battery input power Pb inputted to the driving battery 2 during charging. This battery input power Pb is computed from an input current Ib and an input voltage Vb entered into the driving battery 2, and is represented by the following equation (2).

$$Pb = Ib \times Vb \quad (2)$$

Based on the results of computations by the charger-supplied power computation device 26 and the battery-supplied power computation device 27, the charging efficiency calculation device 28 computes the charging efficiency Ec of the driving battery 2. The charging efficiency Ec of the driving battery 2 is computed from the charger input power Pc computed by the charger-supplied power computation device 26 and the battery input power Pb computed by the battery-supplied power computation device 27, and is represented by the following equation (3):

$$Ec = Pb/Pc \quad (3)$$

The state of charge computation device 22 computes the state of charge (SOC) of the driving battery 2. For example, the driving battery 2 is provided with a voltage sensor and a current sensor, although they are not illustrated. Based on the results of detections by these sensors, the state of charge computation device 22 computes the state of charge of the driving battery 2.

The first charging control unit 23 controls charging of the driving battery 2 on the basis of the charging efficiency Ec of the driving battery 2 computed by the charging efficiency computation device 21. In the present embodiment, the first charging control unit 23 is equipped with a first determination device 29 and a first charging control device 30. The first determination device 29 determines whether or not the charging efficiency Ec of the driving battery 2 computed by the charging efficiency computation device 21 is lower than a predetermined value which has been set beforehand. The first charging control device 30 controls the charger 7 at the time of charging the driving battery 2. At this time, the first charging control device 30 controls the charger 7, as appropriate, in accordance with the results of determination by the first determination device 29. Concretely, if the first determination device 29 determines that the charging efficiency Ec is lower than the predetermined value, the first charging control device 30 controls the charger 7 to stop the charging of the driving battery 2.

The second charging control unit 24 controls charging of the driving battery 2 on the basis of the state of charge (SOC) of the driving battery 2. In the present embodiment, the second charging control unit 24 is equipped with a second determination device 31 and a second charging control device 32. The second determination device 31 determines whether or not the state of charge (SOC) of the driving battery 2 computed by the state of charge computation device 22 has reached a predetermined value. In the present embodiment, the second determination device 31 determines whether or not the state of charge of the driving battery 2 has become 100%, namely, whether or not the driving battery 2 has become fully charged.

The second charging control device 32 controls the charger 7 at the time of charging the driving battery 2. At this time, the second charging control device 32 controls the charger 7, as appropriate, in accordance with the results of determination by the second determination device 31. Concretely, if the second determination device 31 determines that the state of charge of the driving battery 2 has reached the predetermined value, the second charging control device 32 controls the charger 7 to stop the charging of the driving battery 2.

The switching device 25 switches, in response to a request from a user of the electric car 1, between a first charging mode in which charging is controlled by the first charging control unit 23, and a second charging mode in which charging is controlled by the second charging control unit 24. The electric car 1 is provided with a selector switch 9 by which the user performs switching between the first charging mode (ECO charging mode) and the second charging mode (normal charging mode). In compliance with the operation (ON/OFF) of the selector switch 9 by the user, the switching device 25 switches appropriately between the first charging mode and the second charging mode. That is, the charging of the driving battery 2 is controlled by either the first charging control unit 23 or the second charging control unit 24 in response to a request from the user of the electric car 1.

The charging state display device 51 allows the display unit 50 to display the charging efficiency Ec and the state if charge (SOC) of the driving battery 2. That is, the charging state display device 51 transmits signals conformed to the results of computations by the charging efficiency computation device 21 and the state of charge computation device 22, thereby allowing the display unit 50 to display the charging efficiency Ec and the state of charge (SOC) of the driving battery 2. The user of the electric car 1 can easily and visually recognize the charging state of the driving battery 2 from the indications on the display unit 50.

The charging control over the driving battery 2 will be described briefly by reference to changes in various parameters. When charging of the driving battery 2 is started, "constant power charging", in which the driving battery 2 is charged at a constant input power by supplying the constant input power to the charger 7, is performed in the initial stage, as shown in FIG. 3. The constant input power supplied to the charger 7 is supplied to the driving battery 2 and the DC/DC converter, etc. and, since the power consumed by the DC/DC converter, etc. is nearly constant, the power supplied to the driving battery 2 is also constant. As the state of charge (SOC) rises during this process, the voltage V of the driving battery 2 gradually increases. At a time when the voltage V of the driving battery 2 reaches a predetermined voltage V1 (i.e., time T1), the constant power charging is terminated, whereafter "constant voltage charging" is performed. During the period of constant voltage charging, the voltage V of the driving battery 2 is controlled so as to be kept constant. That is, during this period, power supplied to the charger 7 is gradually decreased, and the electric current value of the driving battery 2 gradually decreases. Accordingly, the power supplied to the driving battery 2 also decreases. However, the power consumed by the DC/DC converter, etc. is constant. Thus, of the power supplied from the charger 7, the power consumed by the DC/DC converter, etc. has a great contribution rate, making the value of the charging efficiency low.

When the input power of the driving battery 2 decreases upon implementation of constant voltage charging, the charging efficiency Ec also lowers accordingly. When the charging efficiency Ec lowers, charging with the same electric energy requires a longer charging time than when the charging efficiency Ec is high. As indicated by a dotted line in FIG. 3, moreover, part of the power of the driving battery 2 is always consumed by various accessories installed on the electric car 1. Hence, the proportion of power consumption to the input power into the driving battery 2 is higher during constant voltage charging than during constant power charging. As a result, the charging efficiency Ec during constant voltage charging is lower than that during constant power charging. If the output power of the domestic power supply 40 lowers for some cause even during constant power charging, moreover, the charging efficiency Ec lowers for a similar reason.

In view of these situations, the present invention stops charging in the above state of the decrease in the charging efficiency Ec in response to a request from the user, thereby enabling charging focused on economy. That is, with the present invention, switching takes place between the first charging mode with emphasis on economy (ECO charging mode) and the second charging mode with emphasis on the cruising distance (normal charging mode). When the first charging mode is selected, the first determination device 29 determines, as appropriate, whether the charging efficiency Ec is smaller than a predetermined value Ec1 (see FIG. 3). If it is determined that the charging efficiency Ec is lower than the predetermined value Ec1 (time T2), the first charging control device 30 controls the charger 7 to stop charging of the driving battery 2. In other words, charging is performed only during a period in which the charging efficiency Ec is high. In the first charging mode, the driving battery 2 is not fully charged, and the cruising distance becomes somewhat short, but the economic efficiency can be increased. If the second charging mode is selected, on the other hand, charging is performed until the driving battery 2 is fully charged, regardless of the charging efficiency Ec. In the second charging mode, therefore, the cruising distance can be lengthened maximally, although the economic efficiency is somewhat low.

Figure 4:
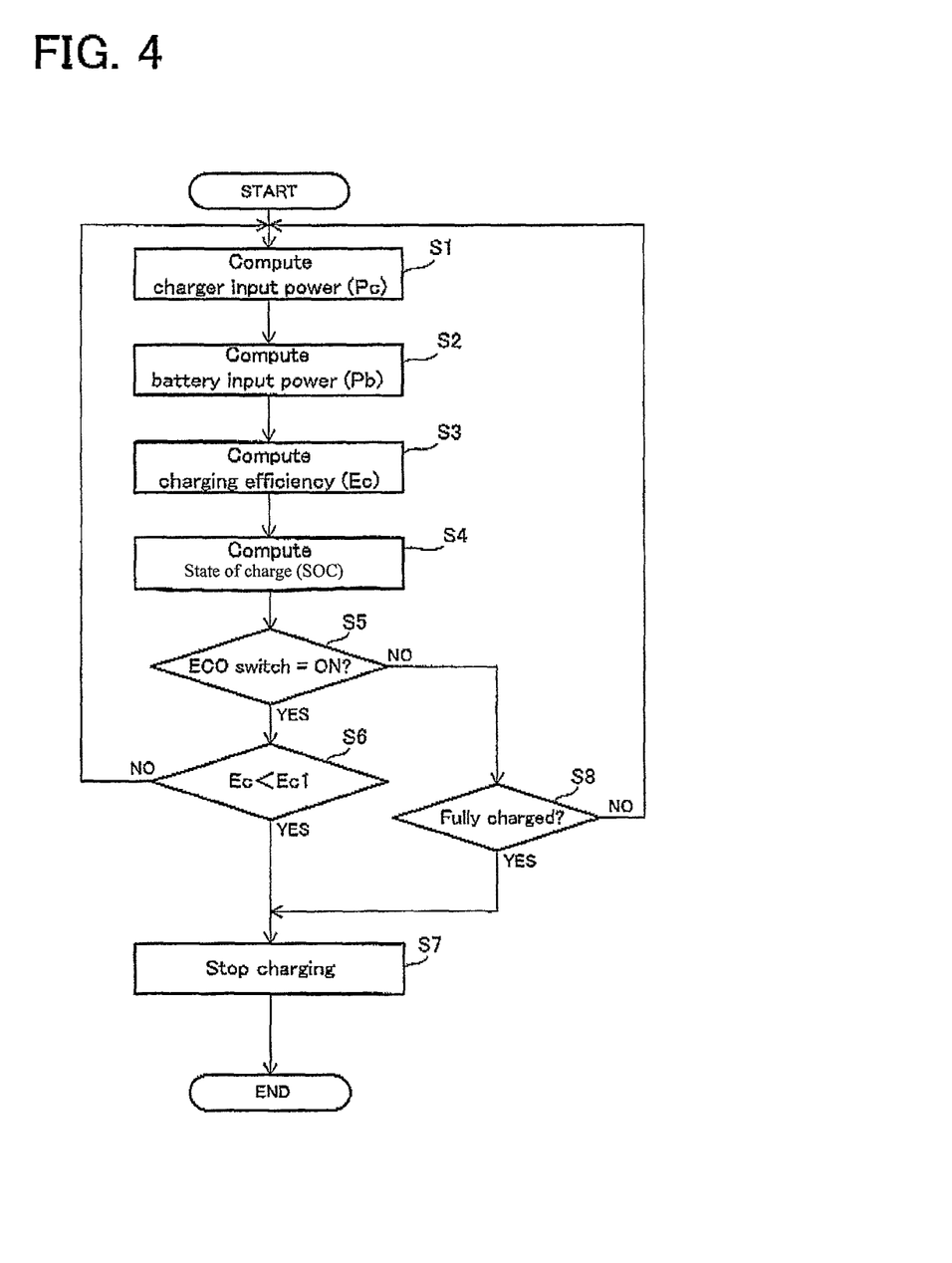
FIG. 4 is a flow chart showing a charging control method according to the embodiment.

The charging control method for the driving battery according to the present embodiment will be described further by reference to a flow chart in FIG. 4.

When charging of the driving battery 2 is started, the state of charge (SOC) and the charging efficiency Ec of the driving battery 2 are computed appropriately. In the present embodiment, for example, the charging efficiency Ec is computed, as appropriate, by the charging efficiency computation device 21 in Steps S1 to S3. Concretely, in Step S1, the charger input power Pc which is inputted from the domestic power supply 40 to the charger 7 is computed by the charger-supplied power computation device 26. Then, in Step S2, the battery input power Pb which is inputted to the driving battery 2 is computed by the battery-supplied power computation device 27. Then, in Step S3, the charging efficiency Ec of the driving battery 2 is computed from the charger input power Pc and the battery input power Pb by the charging efficiency calculation device 28. In Step S4, the state of charge (SOC) is computed by the state of charge computation device 22.

Then, in Step S5, the ON/OFF state of the selector switch (ECO switch) 9 is determined by the switching device 25. If the selector switch 9 is ON (Step S5: Yes), the charging mode is switched to the first charging mode by the switching device 25 to continue the charging of the driving battery 2, and the program proceeds to Step S6. In Step S6, it is determined by the first determination device 29 whether or not the charging efficiency Ec of the driving battery 2 is lower than the predetermined value Ec1. If the first determination device 29 determines that the charging efficiency Ec is lower than the predetermined value Ec1 (Step S6: Yes), the charger 7 is controlled by the first charging control device 30 to stop the charging of the driving battery 2 (Step S7), whereupon a series of charging control steps is completed. If, in Step S6, the first determination device 29 determines that the charging efficiency Ec is equal to or higher than the predetermined value Ec1 (Step S6: No), on the other hand, the program returns to Step S1, continuing the charging of the driving battery 2. It is to be noted that the predetermined value Ec1 may be set, as appropriate, in consideration of the characteristics of the driving battery 2, etc., and no limitation is imposed thereon.

In the present embodiment, the predetermined value Ec1 is preset at 0.8 (80%) as an efficiency in constant power charging performed under normal conditions. If it is assumed that the input to the charger 7 is 1.5 kW and the efficiency of the charger is 90%, for example, the output power of the charger 7 is 1.35 kW. If the power consumption of the accessories is assumed to be 0.15 kW, the input power to the driving battery 2 is 1.2 kW. Hence, the charging efficiency Ec in this case is 0.8 (=1.2/1.5), so that the charging of the driving battery 2 is continued. On the other hand, if the input power to the charger 7 is 1.4 kW, and the efficiency of the charger 7 and the power consumption of the accessories remain unchanged, upon shift from constant power charging to constant voltage charging, for example, then the input power to the driving battery 2 is 1.11 kW. The charging efficiency Ec in this case is 0.79, thus stopping the charging of the driving battery 2.

If, in Step S5, the selector switch 9 is OFF (Step S5: No), the charging mode is switched to the second charging mode by the switching device 25 to continue the charging of the driving battery 2, and the program proceeds to Step S8. In Step S8, the second determination device 31 determines whether or not the state of charge (SOC) of the driving battery 2 has reached 100%, namely, whether or not the driving battery 2 has been fully charged. If it is determined by the second determination device 31 that the driving battery 2 has become fully charged (Step S8: Yes), the charger 7 is controlled by the second charging control device 32 to stop the charging of the driving battery 2 (Step S7), whereupon a series of charging control operations is completed. If, in Step S8, it is determined by the second determination device 31 that the driving battery 2 has not been fully charged (Step S8: No), the program returns to Step S1, and the charging of the driving battery 2 is continued.

According to the present invention, as described above, it goes without saying that the driving battery 2 can be charged to a full charge. Depending on the user's request, charging is performed only during a period with a high charging efficiency Ec, whereby the economic efficiency can be raised. By switching between the first charging mode and the second charging mode in response to a request from the user, optimum charging conformed to different situations can be performed. Besides, the present invention can be used not only for electric cars, but also for other electric vehicles such as plug-in hybrid vehicles.

In the above-described embodiment, when the first charging mode (ECO charging mode) is selected by the user, charging is stopped only based on the charging efficiency Ec of the driving battery 2. However, charging may be stopped based on, for example, both of the charging efficiency Ec and the state of charge (SOC).

That is, the first charging control unit 23 may control charging of the driving battery 2 based on both of the charging efficiency Ec of the driving battery 2 computed by the charging efficiency computation device 21, and the state of charge (SOC) of the driving battery 2 computed by the state of charge computation device 22. In this embodiment, the first determination device 29 determines whether or not the charging efficiency Ec is lower than the predetermined value Ec1, and also determines whether or not the state of charge (SOC) is equal to or higher than a predetermined value, e.g., 90%. If it is determined by the first determination device 29 that the charging efficiency Ec is lower than the predetermined value Ec1, and that the state of charge (SOC) is equal to or higher than 90%, then the first charging control device 30 controls the charger 7 to stop the charging of the driving battery 2.

Consequently, when the first charging mode is selected, namely, even when charging with a high economic efficiency is carried out, sufficient electric energy can be charged into the driving battery 2.

As stated earlier, the electric car 1 is equipped with the display unit 50 and, while the driving battery 2 is being charged, the charging efficiency Ec and the state of charge (SOC) are displayed on the display unit 50. That is, the charging state display device 51 transmits signals, which are conformed to the charging efficiency Ec computed by the charging efficiency computation device 21 and the state of charge (SOC) computed by the state of charge computation device 22, to the display unit 50. As a result, indications of the charging efficiency Ec and the state of charge (SOC) on the display unit 50 are changed as appropriate.

Figure 5:
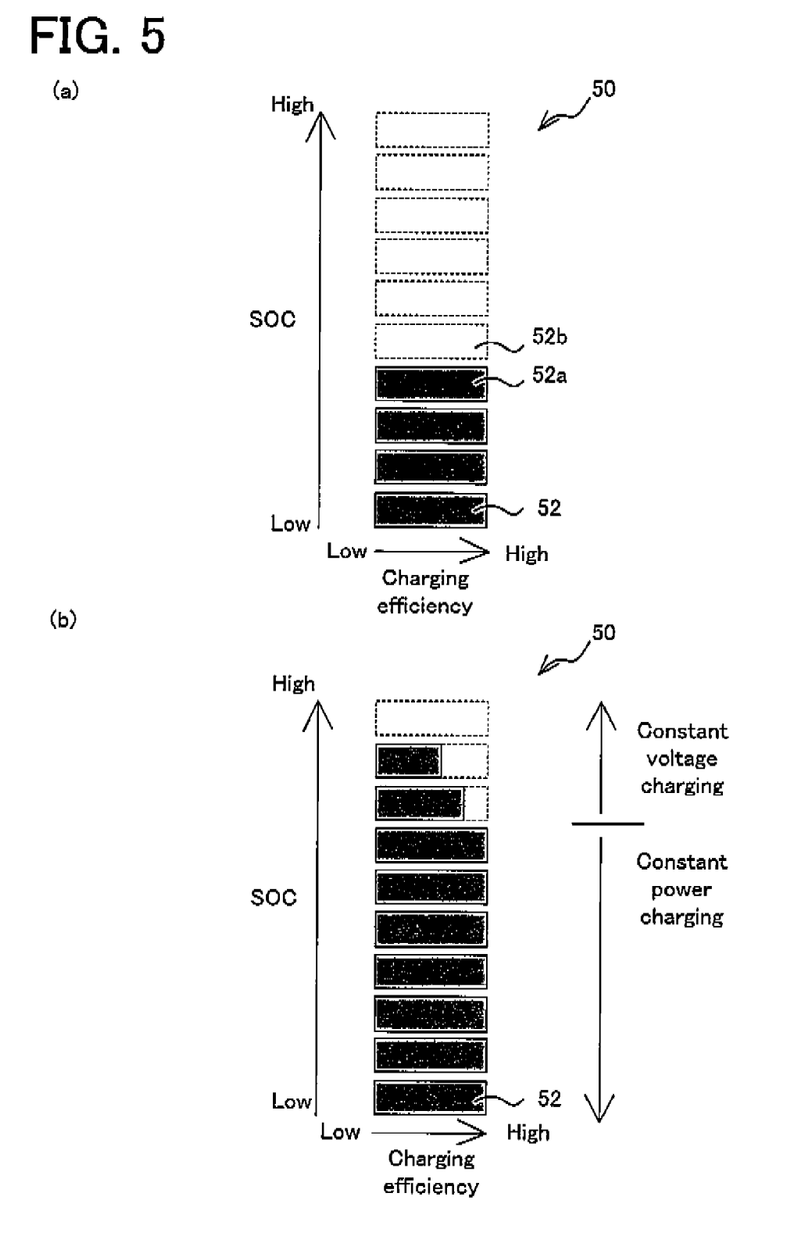
FIGS. 5(a) and 5(b) are views each showing an example of the display state of a charging state display device according to the embodiment.

In the display unit 50, a plurality of (10 in the present embodiment) rectangular segments 52 are arranged in a longitudinal direction (a vertical direction in the drawings), as shown in FIGS. 5(a) and 5(b). The respective segments 52 can be individually lit, and the lighting range of the segments 52 changes according to the state of charge (SOC) and the charging efficiency Ec of the driving battery 2. In the present embodiment, the state of charge (SOC) is expressed as the number of the segments 52 being lit, whereas the degree of the charging efficiency Ec is expressed as the length of each segment in a lateral direction (a horizontal direction in the drawings).

For example, FIG. 5(a) represents an example showing a state in which the sate of charge (SOC) of the driving battery 2 is 30% to 40%, and constant power charging is performed, a state where the lower four segments 52 of the ten segments 52 are lit. Of these four segments 52, the uppermost segment 52a may blink. In this case, at a time when the state of charge reaches 40%, the segment 52a is lit, and the fifth segment 52b just above the segment 52a is caused to blink.

If constant power charging is normally performed at this time, the charging efficiency Ec is kept high (see FIG. 3). Thus, each segment 52 is in a state in which all of its region is lit.

FIG. 5(b) represents an example showing a state in which the state of charge (SOC) of the driving battery 2 rises to 80% to 90%, and constant voltage charging is performed, a state where with the rise of the state of charge of the driving battery 2, the number of the segments 52 lighting up increases from 4 to 9. When the state of charge of the driving battery 2 rises to a certain degree, as mentioned above, constant voltage charging is carried out, and the charging efficiency Ec gradually lowers during constant voltage charging (see FIG. 3). Hence, the lighting region of each segment 52 during constant voltage charging becomes narrower than during constant power charging. That is, as the charging efficiency Ec lowers, the length of each segment 52 in the lateral direction decreases.

As noted above, the charging state including at least the charging efficiency Ec is displayed on the display unit 50 on the basis of signals transmitted from the charging state display device 51. By so doing, the user of the electric car 1 can easily and visually recognize a change in the charging state during charging of the driving battery 2. As stated earlier, charging of the driving battery 2 is basically stopped automatically with a predetermined timing in each charging mode. The easy visual recognition of the charging efficiency Ec enables the user of the electric car 1 to stop charging with a desired timing, for example, in the event of a decline in the charging efficiency Ec.

Figure 6:
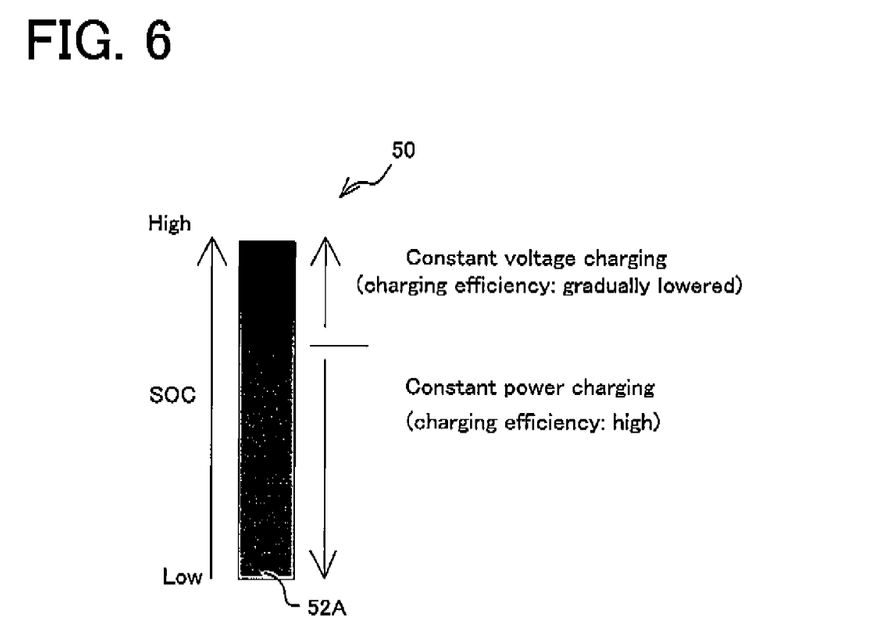
FIG. 6 is a view showing another example of the display state of the charging state display device according to the embodiment.

As an example of the method of displaying the charging efficiency Ec on the display unit 50, the above example illustrates the charging efficiency Ec expressed as the length of the segment 52. Needless to say, however, the method of displaying the charging efficiency Ec is not limited to this example. For example, a change in the charging efficiency Ec during charging may be represented by the color of the segment 52. In an example shown in FIG. 6, the state of charge (SOC) and the charging efficiency Ec are represented by a segment 52A which is elongated in the longitudinal direction. In this example, as the state of charge increases, the lighting range of the segment 52A in the longitudinal direction expands. As the charging efficiency Ec decreases, moreover, the color of the lighting range of the segment 52A changes. Concretely, when the charging efficiency Ec is high, the segment 52A lights up in a green color and, as the charging efficiency Ec lowers, the color gradually changes to an orange color. This representation of the change in the charging efficiency Ec by the color of the segment 52A also enables the user to recognize the change in the charging efficiency Ec easily and visually.

The color changed according to the charging efficiency Ec is not limitive, and changes in the charging efficiency Ec may be expressed as shades of the color, for example.

In the above examples, the charging efficiency Ec and the state of charge (SOC) are combined to make displays. Of course, however, the charging efficiency Ec and the state of charge (SOC) may be displayed separately.

The embodiment of the present invention has been described above. It goes without saying, however, that the present invention is not limited to this embodiment, and various changes and modifications may be made without departing from the gist of the present invention.

EXPLANATIONS OF LETTERS OR NUMERALS

1 Electric car (electric vehicle)
2 Driving battery
3 Inverter
4 Driving motor
5 DC/DC converter
6 Auxiliary battery
7 Charger
8 Charging inlet
9 Selector switch
20 Control unit (charging control apparatus)

21 Charging efficiency computation device
22 State of charge computation device
23 First charging control unit
24 Second charging control unit
25 Switching device
26 Charger-supplied power computation device
27 Battery-supplied power computation device
28 Charging efficiency calculation device
29 First determination device
30 First charging control device
31 Second determination device
32 Second charging control device
40 Domestic power supply (commercial power supply)
50 Display unit
51 Charging state display device
52 Segment

The invention claimed is:

1. A charging control apparatus for an electric vehicle in which a driving battery loaded on the vehicle is charged by power supplied from an external power supply via a charger, comprising:
a charging efficiency computation device that computes a charging efficiency of the driving battery;
a state of charge computation device that computes a state of charge of the driving battery;
a switching device that switches, in response to a request from a user of the vehicle, between a first charging mode in which the charger is controlled based on the charging efficiency to charge the driving battery, and a second charging mode in which the charger is controlled based on the state of charge to charge the driving battery;
a charger-supplied power computation device that computes power supplied from the external power supply to the charger, and
a battery-supplied power computation device that computes power supplied from the charger to the driving battery,
wherein the charging efficiency computation device computes the charging efficiency based on results of computations by the charger-supplied power computation device and the battery-supplied power computation device.

2. The charging control apparatus for an electric vehicle according to claim 1, further comprising:
a first determination device that determines whether or not the charging efficiency of the driving battery computed by the charging efficiency computation device is lower than a predetermined value,
wherein if the first charging mode is selected by the switching device, and if it is determined by the first determination device that the charging efficiency is lower than the predetermined value, then the charger is controlled to stop charging of the driving battery.

3. The charging control apparatus for an electric vehicle according to claim 2, wherein
the charging efficiency computation device sets a value, which has been obtained by dividing the power supplied from the charger to the driving battery by the power supplied from the external power supply to the charger, as the charging efficiency.

4. The charging control apparatus for an electric vehicle according to claim 3, further comprising:
a second determination device that determines whether or not the state of charge of the driving battery computed by the state of charge computation device has reached a predetermined value,
wherein if the second charging mode is selected by the switching device, and if it is determined by the second determination device that the state of charge has reached the predetermined value, then the charger is controlled to stop charging of the driving battery.

5. The charging control apparatus for an electric vehicle according to claim 3, further comprising:
a charging state display device that allows a display unit provided in the vehicle to display a charging state of the driving battery,
wherein the charging state display device allows the display unit to display at least the charging efficiency as the charging state.

6. The charging control apparatus for an electric vehicle according to claim 2, further comprising:
a second determination device that determines whether or not the state of charge of the driving battery computed by the state of charge computation device has reached a predetermined value,
wherein if the second charging mode is selected by the switching device, and if it is determined by the second determination device that the state of charge has reached the predetermined value, then the charger is controlled to stop charging of the driving battery.

7. The charging control apparatus for an electric vehicle according to claim 2, further comprising:
a charging state display device that allows a display unit provided in the vehicle to display a charging state of the driving battery,
wherein the charging state display device allows the display unit to display at least the charging efficiency as the charging state.

8. The charging control apparatus for an electric vehicle according to claim 1, further comprising
a second determination device that determines whether or not the state of charge of the driving battery computed by the state of charge computation device has reached a predetermined value,
wherein if the second charging mode is selected by the switching device, and if it is determined by the second determination device that the state of charge has reached the predetermined value, then the charger is controlled to stop charging of the driving battery.

9. The charging control apparatus for an electric vehicle according to claim 8, further comprising:
a charging state display device that allows a display unit provided in the vehicle to display a charging state of the driving battery,
wherein the charging state display device allows the display unit to display at least the charging efficiency as the charging state.

10. The charging control apparatus for an electric vehicle according to claim 1, further comprising:
a charging state display device that allows a display unit provided in the vehicle to display a charging state of the driving battery,
wherein the charging state display device allows the display unit to display at least the charging efficiency as the charging state.

11. The charging control apparatus for an electric vehicle according to claim 10, wherein
the charging state display device allows the display unit to display the state of charge as well as the charging efficiency as the charging state.

12. The charging control apparatus for an electric vehicle according to claim 11, wherein the charging state display device allows the display unit to display a degree of the charging efficiency as a length of a segment.

13. The charging control apparatus for an electric vehicle according to claim 11, wherein the charging state display device allows the display unit to display a change in the charging efficiency as a change in a color of the segment.

14. The charging control apparatus for an electric vehicle according to claim 10, wherein the charging state display device allows the display unit to display a degree of the charging efficiency as a length of a segment.

15. The charging control apparatus for an electric vehicle according to claim 10, wherein the charging state display device allows the display unit to display a change in the charging efficiency as a change in a color of the segment.

16. The charging control apparatus for an electric vehicle according to claim 1, further comprising:

a second determination device that determines whether or not the state of charge of the driving battery computed by the state of charge computation device has reached a predetermined value, wherein if the second charging mode is selected by the switching device, and if it is determined by the second determination device that the state of charge has reached the predetermined value, then the charger is controlled to stop charging of the driving battery.

17. The charging control apparatus for an electric vehicle according to claim 1, further comprising:

a charging state display device that allows a display unit provided in the vehicle to display a charging state of the driving battery, wherein the charging state display device allows the display unit to display at least the charging efficiency as the charging state.

* * * * *